United States Patent [19]

Takahashi et al.

[11] Patent Number: 5,327,462

[45] Date of Patent: Jul. 5, 1994

[54] DIGITAL TYPE VSB MODULATION APPARATUS

[75] Inventors: Yasuo Takahashi; Tatsuya Ishikawa; Toshio Aoki; Nobuyuki Miki; Masatoshi Hamada; Masatoshi Hamada; Yasuhiro Hashimoto; Kenji Ueoka; Nobuhiko Kawai, all of Tokyo, Japan

[73] Assignees: Kabushiki Kaisha Toshiba, Kawasaki; Nippon Hoso Kyokai, Tokyo, both of Japan

[21] Appl. No.: 832,724

[22] Filed: Feb. 7, 1992

[30] Foreign Application Priority Data

Feb. 8, 1991 [JP] Japan .................. 3-018030
Aug. 20, 1991 [JP] Japan .................. 3-208200

[51] Int. Cl.$^5$ .................. H03C 1/52; H04L 27/04
[52] U.S. Cl. .................. 375/61; 332/170
[58] Field of Search .................. 375/39, 61, 50, 43, 375/24; 455/47, 46, 109; 332/170; 370/20

[56] References Cited

U.S. PATENT DOCUMENTS 3,559,070  1/1971  Sharpe .................. 375/61
4,974,236 11/1990  Gurcan et al. .................. 375/61

FOREIGN PATENT DOCUMENTS 0323675  7/1989  European Pat. Off. .
1165104  3/1964  Fed. Rep. of Germany .
2633127 12/1989  France .

OTHER PUBLICATIONS

IEEE Transactions on Communications, vol. 23, No. 3, Mar. 1975, pp. 352-361, F. S. Hill, Jr., "Optimum Pulse Shapes for Pulse-Amplitude Modulation Data Transmission Using Vestigial Sideband Modulation".
Proceedings of the National Electronics Conference, vol. 18, 1962, pp. 51-58, F. F. Kuo, et al., "Hilbert Transforms and Modulation Theory".
Proceedings of the I.R.E., vol. 27, No. 11, Nov. 1939, pp. 687-690, N. Koomans, "Asymmetric-Sideband Broadcasting".

*Primary Examiner*—Stephen Chin
*Assistant Examiner*—Tesfaldet Bocure
*Attorney, Agent, or Firm*—Oblon, Spivak, McClelland, Maier & Neustadt

[57] ABSTRACT

In this invention, in order to generate a VSB modulation signal from a digital baseband signal, an in-phase component of a modulation signal having a frequency spectrum having a high-frequency component whose level is half that of its low-frequency component, and an orthogonal component of the modulation signal of a high-frequency component having a frequency spectrum whose level is half that of the low-frequency component are generated from the baseband signal. The in-phase component and the orthogonal component are multiplied with carrier signals to obtain a carrier in-phase component and a carrier orthogonal component. The carrier in-phase component and the carrier orthogonal component are synthesized to obtain a VSB modulation signal.

18 Claims, 13 Drawing Sheets

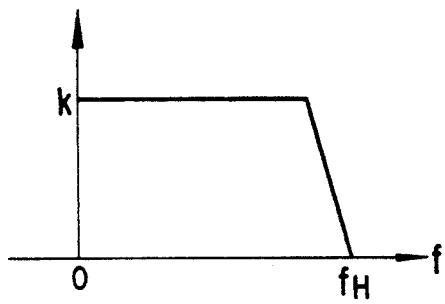
F I G. 3A
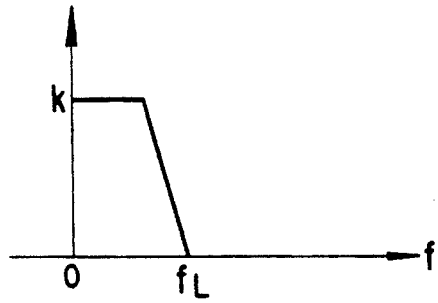
F I G. 3B
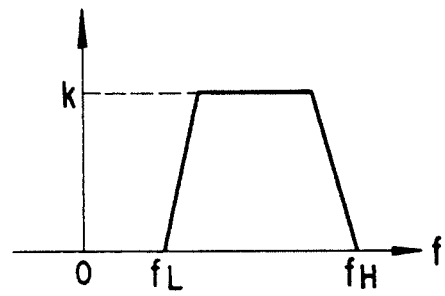
F I G. 3C
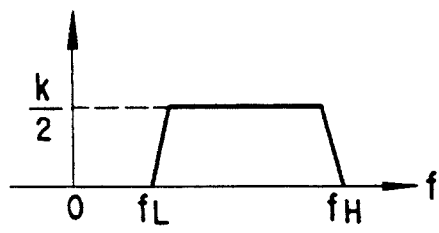
F I G. 3D
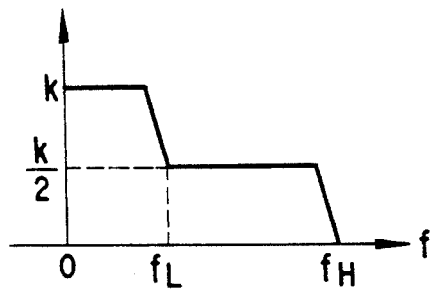
F I G. 3E

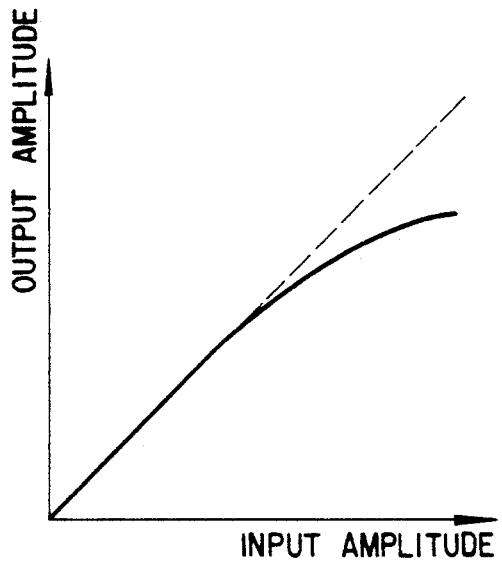
F I G. 10A
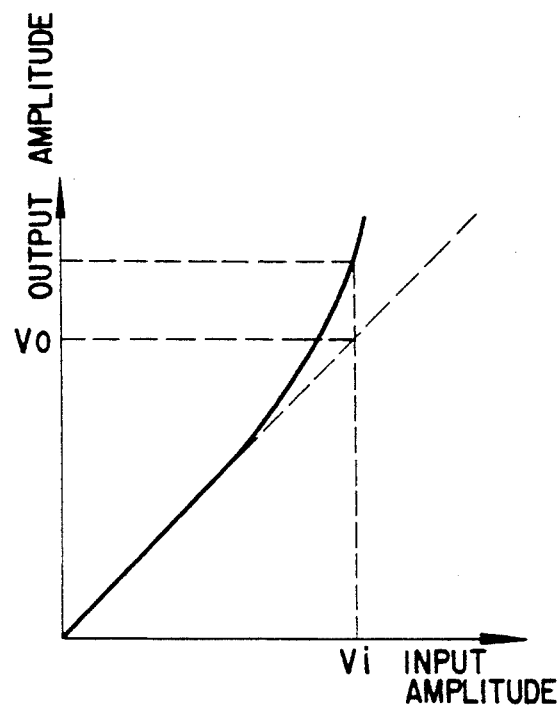
F I G. 10B
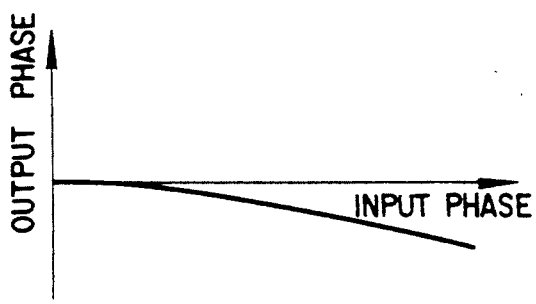
F I G. 11A
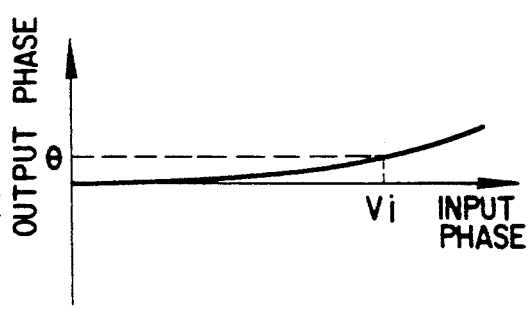
F I G. 11B

DIGITAL TYPE VSB MODULATION APPARATUS

BACKGROUND OF THE INVENTION

1. Field of the Invention

The present invention relates to a digital type VSB modulation apparatus for generating a VSB (vestigial sideband) modulation signal from a digital baseband signal.

2. Description of the Related Art

As is well known, a video modulation means used in a conventional television transmission apparatus AM-modulates an analog baseband signal to convert it into a DSB (double sideband) modulation signal, and limits the bandwidth of the DSB modulation signal using a band-pass filter included in an intermediate frequency circuit or a transmission frequency circuit, thereby obtaining a VSB modulation signal (see, e.g., "Broadcast Technology Library 10, Broadcast Equipment, Chapter 3, Television Broadcast Equipment" issued on Apr. 20, 1983 by Nippon Hoso Publishing Inc.). In this case, as the band-pass filter, a surface acoustic filter is generally used. However, the surface acoustic filter is economically disadvantageous since separate filters must be prepared in units of use frequencies. In addition, the surface acoustic filter suffers from large ripples of group delay time characteristics due to its structure. For this reason, the group delay time characteristics of a transmission apparatus itself depend on the surface acoustic filter.

Recently, strong demand has arisen for a digital VSB modulation apparatus. However, it is very difficult in terms of a structure to simply replace circuit sections constituting a conventional VSB modulation means with digital circuits having the same functions. For example, when the band-pass filter is realized by a digital filter, a high-speed circuit operation is required, and the number of taps becomes very large since the attenuation characteristic curve of the stop band is very steep, resulting in a large circuit scale.

SUMMARY OF THE INVENTION

The present invention has been made in consideration of the above situation, and has as its object to provide a digital type VSB modulation apparatus, which can generate a VSB modulation signal from a digital baseband signal with a simple arrangement.

According to one aspect of the present invention, there is provided a digital type VSB modulation apparatus comprising: a generation circuit for generating, from a digital baseband signal, an in-phase component of a modulation signal having a frequency spectrum having a high-frequency component whose level is half that of a low-frequency component thereof, and an orthogonal component of the modulation signal of a high-frequency component having a frequency spectrum whose level is half that of the low-frequency component; a carrier component generation circuit for multiplying the in-phase component and the orthogonal component output from the generation circuit with carrier signals so as to obtain a carrier in-phase component and a carrier orthogonal component; and a synthesis circuit for synthesizing the carrier in-phase component and the carrier orthogonal component output from the carrier component generation circuit so as to obtain a VSB modulation signal.

BRIEF DESCRIPTION OF THE DRAWINGS

FIGS. 3A to 3E, and FIGS. 4A to 4C are graphs for explaining the operation of the embodiment shown in FIG. 2;

FIGS. 10A and 10B, and FIGS. 11A and 11B are graphs for explaining distortion compensation applied to the present invention;

DETAILED DESCRIPTION OF THE PREFERRED EMBODIMENTS

Figure 1A:
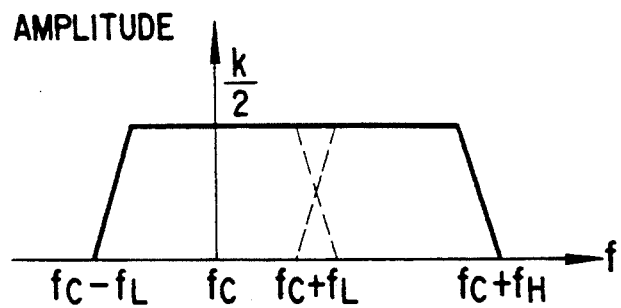
FIGS. 1A to 1E are graphs for explaining the principle of the present invention.

Prior to the description of an embodiment of the present invention, the principle of the present invention will be described below. More specifically, FIG. 1A shows the frequency spectrum of a VSB modulation signal. In this VSB modulation signal, DSB (double sideband) modulation is performed for low-frequency components of a baseband signal falling within a range between 0 and $f_L$ (the lower limit of an occupied bandwidth) Hz, and SSB modulation (single sideband) modulation is performed for high-frequency components of the baseband signal falling within a range between $f_L$ and $f_H$ (the upper limit of the occupied bandwidth) Hz.

Figure 1B:
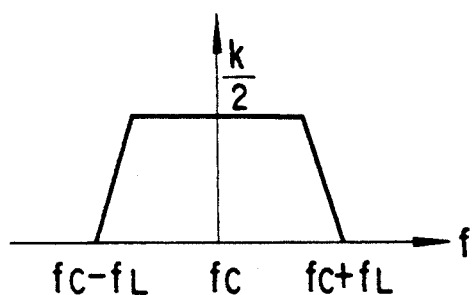
Figure 1C:
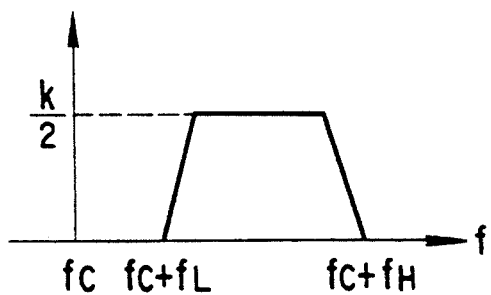

For this reason, the VSB modulation signal can be expressed as a function S(t) of time t as follows:

$$S(t) = (1 + k\cos2\pi f_1 t)\cos2\pi f_c t + k/2\cos2\pi(f_c+f_2)t \quad (1)$$

where k is the modulation index, fc is the carrier frequency, and $f_1$ and $f_2$ are the modulation signal frequencies. These frequencies satisfy relations $0 < f_1 \leq f_L$ and $f_L \leq f_2 < f_H$. The first term of the right-hand side of equation (1) corresponds to the DSB modulation signal, and the second term thereof corresponds to the SSB modulation signal. FIG. 1B shows the frequency spectrum of the DSB modulation signal, and FIG. 1C shows the frequency spectrum of the SSB modulation signal.

Equation (1) can be converted as follows:

$$\begin{aligned}S(t) &= (1 + k\cos2\pi f_1 t)\cos2\pi f_c t + \\ &\quad \frac{k}{2}(\cos2\pi f_2 t \cdot \cos2\pi f_c t - \sin2\pi f_2 t \cdot \sin2\pi f_c t) \\ &= \left(1 + k\cos2\pi f_1 t + \frac{k}{2}\cos2\pi f_2 t\right)\cos2\pi f_c t - \\ &\quad \frac{k}{2}\sin2\pi f_c t \cdot \sin2\pi f_2 t\end{aligned} \quad (2)$$

Figure 1D:
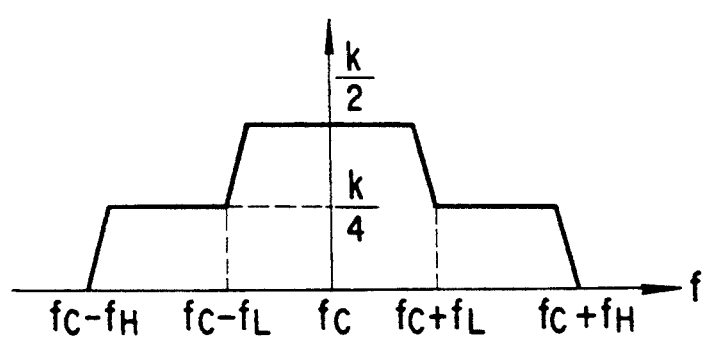
Figure 1E:
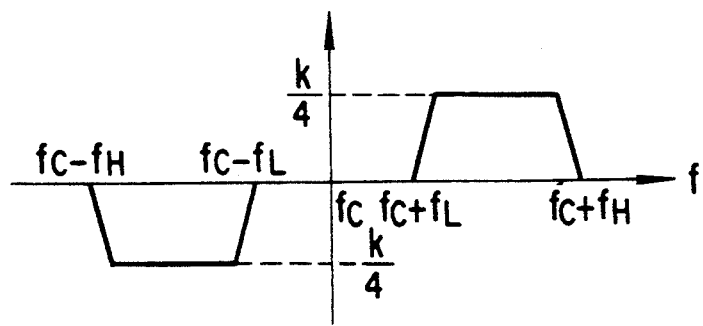

The first term of the right-hand side of equation (2) represents a carrier in-phase component, and the second term thereof represents a carrier orthogonal component. FIG. 1D shows the frequency spectrum of the carrier in-phase component, and FIG. 1E shows the frequency spectrum of the carrier orthogonal component. As can be understood from these figures, a synthesized spectrum of the carrier in-phase component and the carrier orthogonal components becomes the frequency spectrum of the VSB modulation signal shown in FIG. 1.

Figure 2:
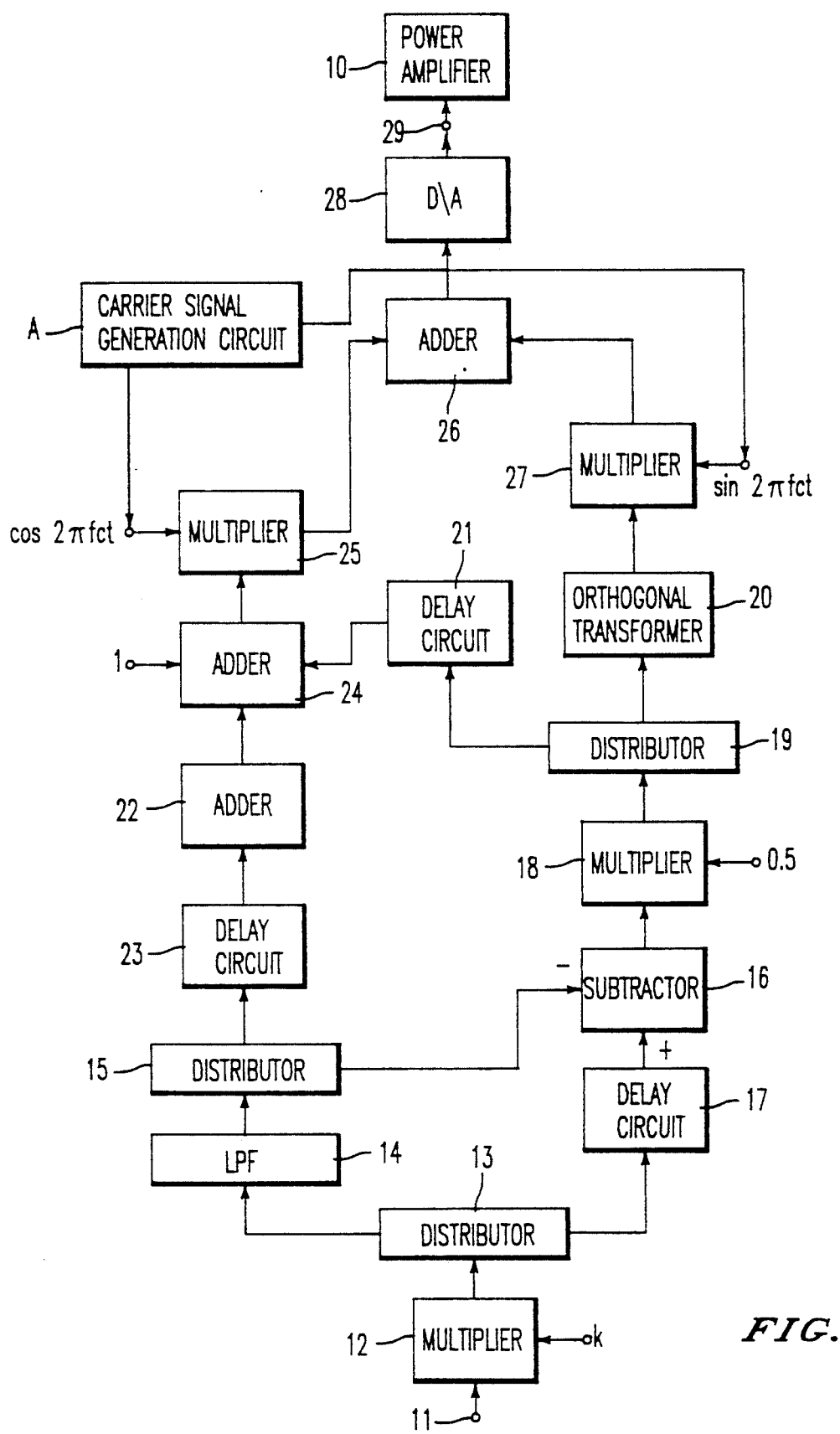
FIG. 2 is a block diagram showing the first embodiment of a digital VSB modulation apparatus according to the present invention.

An embodiment of the present invention based on the above-mentioned principle will be described below with reference to the accompanying drawings. In FIG. 2, reference numeral 11 denotes an input terminal, which is supplied with a baseband signal digital-converted at a sampling frequency rs. The sampling frequency fs satisfies relations $fs > 2f_H$ and $fs > 2fc$.

The digital baseband signal supplied to the input terminal 11 is multiplied with the modulation index k by a multiplier 12 so as to be converted to a frequency spectrum shown in FIG. 3A. Thereafter, the baseband signal is supplied to a distributor 13. One output of the distributor 13 is supplied to an LPF (low-pass filter) 14, so that the high-frequency components of the baseband signal are cut, thereby extracting low-frequency components falling within a range between 0 and $f_L$ Hz, as shown in FIG. 3B. The output from the LPF 14 is distributed to two outputs by a distributor 15, 15 and one output is supplied to the negative input terminal "−" of a subtracter 16.

The other output from the distributor 13 is delayed by a processing time of the LPF 14 by a delay circuit 17, and the delayed output is supplied to the positive input terminal "+" of the subtracter 16. The subtracter 16 subtracts the low-frequency components of the baseband signal (FIG. 3B) supplied to its negative input terminal "−" from the original baseband signal (FIG. 3A) supplied to its positive input terminal "+", thereby extracting high-frequency components of the baseband signal falling within a range between $f_L$ and $f_H$ Hz, as shown in FIG. 3C.

The high-frequency baseband signal output from the subtracter 16 is multiplied with a fixed coefficient "0.5" by a multiplier 18 so as to be converted into a frequency spectrum shown in FIG. 3D. Thereafter, the baseband signal is supplied to a distributor 19. One output from the distributor 19 is supplied to an orthogonal transformer 20. The orthogonal transformer 20 has a function, known as the Hilbert transformation, of shifting the phase of a signal in the entire target frequency band through 90°. More specifically, if the input to the orthogonal transformer 20 is given by:

$$(k/2)\cdot\cos 2\pi\cdot f_2 \cdot t$$

then, the transformer transforms its output to:

$$(k/2)\cdot\sin 2\pi\cdot f_2\cdot t$$

The other output from the distributor 19, which output is given by:
$$(k/2)\cdot\cos 2\pi\cdot f_2\cdot t$$

is delayed by a processing time of the orthogonal transformer 20 by a delay circuit 23, and the delayed output is supplied to one input terminal of an adder 22. The other output from the distributor 15, which output is given by:

$$k\cdot\cos 2\pi\cdot f_1\cdot t$$

is delayed by a processing time of the orthogonal transformer 20 by a delay circuit 23, and the delayed output is supplied to the other input terminal of the adder 22. The adder 22 adds the low-frequency baseband signal shown in FIG. 3B to the high-frequency baseband signal shown in FIG. 3D, thereby generating a baseband signal having a frequency spectrum shown in FIG. 3E.

The output from the adder 22 is added to a constant "1" by an adder 24, and the sum output is multiplied, by a multiplier 25, with a carrier component given by:

$$\cos 2\pi\cdot fc\cdot t$$

whis is generated by carrier signal generator circuit A. As a result, a carrier in-phase component shown in FIG. 4A, i.e., the first term of the right-hand side of equation (2) described above, is obtained, and is supplied to one input terminal of an adder 26.

The output from the orthogonal transformer 20, which output is given by:

$$-(k/2)\cdot\sin 2\pi\cdot f_2\cdot t$$

is multiplied, by a multiplier 27, with the carrier component given by:

$$\sin 2\pi\cdot fc\cdot t$$

which is generated by carrier signal generator circuit A. As a result, a carrier orthogonal component shown in FIG. 4B, i.e., the second term of the right-hand side of equation (2) described above is obtained, and is supplied to the other input terminal of the adder 26. Upon multiplication with the carrier components:

$$\cos 2\pi\cdot fc\cdot t \text{ and } \sin 2\pi\cdot fc\cdot t$$

the spectrum levels at two sides of a carrier become half the spectrum level of the original baseband signal.

Figure 4A:
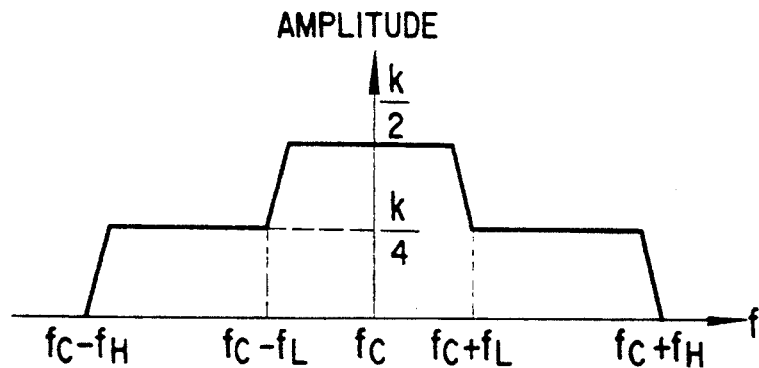
Figure 4B:
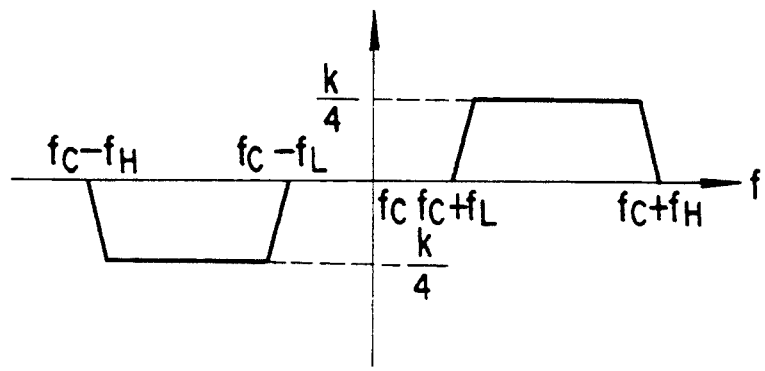
Figure 4C:
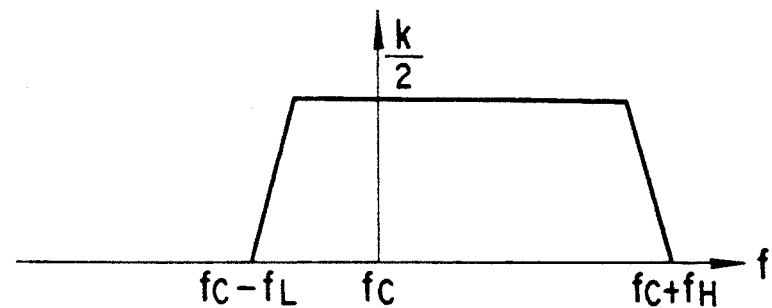

The adder 26 adds the carrier in-phase component and the carrier orthogonal component shown in FIGS. 4A and 4B, thereby generating a VSB modulation signal having a frequency spectrum shown in FIG. 4C. Thereafter, the VSB modulation signal output from the adder 26 is converted into an analog signal by a D/A (digital-to-analog) converter 28, and is output through an output terminal 29. The VSB modulation signal is then supplied to a power amplifier 10 for, e.g., transmission.

Therefore, according to the arrangement of the above embodiment, since the carrier in-phase component and the carrier orthogonal component are generated from a digital baseband signal, and these components are added to each other to obtain the VSB modulation signal, the arrangement can become very simple and compact as compared with the prior art wherein circuit sections are simply replaced with digital circuits having the same functions.

Figure 5:
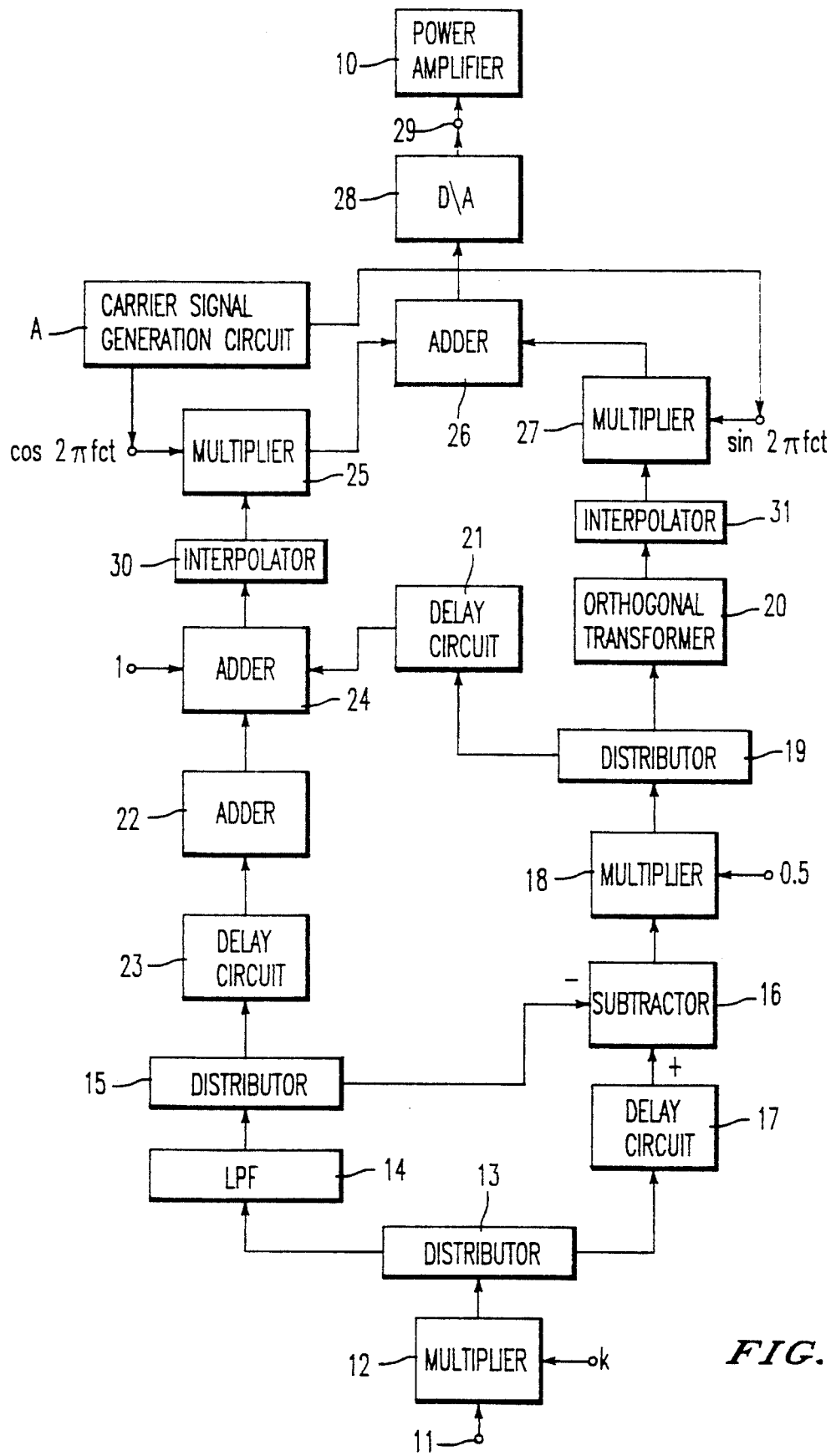
FIGS. 5 and 6 are block diagrams showing arrangements of partial modifications of the first embodiment.

The embodiment shown in FIG. 2 exemplifies a case wherein the condition $fs > 2fc$ is satisfied. FIG. 5 shows a modification when this condition is not satisfied. In the following description, the same reference numerals in FIG. 5 denote the same parts as in FIG. 2. In FIG. 5, interpolators 30 and 31 are respectively inserted between the adder 24 and the multiplier 25, and between the orthogonal transformer 20 and the multiplier 27. These interpolators 30 and 31 have a function of converting the sampling frequency fs to a frequency corresponding to an integer multiple of the frequency fs while preserving the spectrum of an input signal. If an output sampling frequency $fs_1$ of the interpolators 30 and 31 is set to satisfy:

$$fs1 > 2fc$$

the above embodiment can also be applied to a case wherein the carrier frequency fc is high, and the sampling frequency fs of the baseband signal is lower than a frequency twice the carrier frequency fc.

Figure 6:
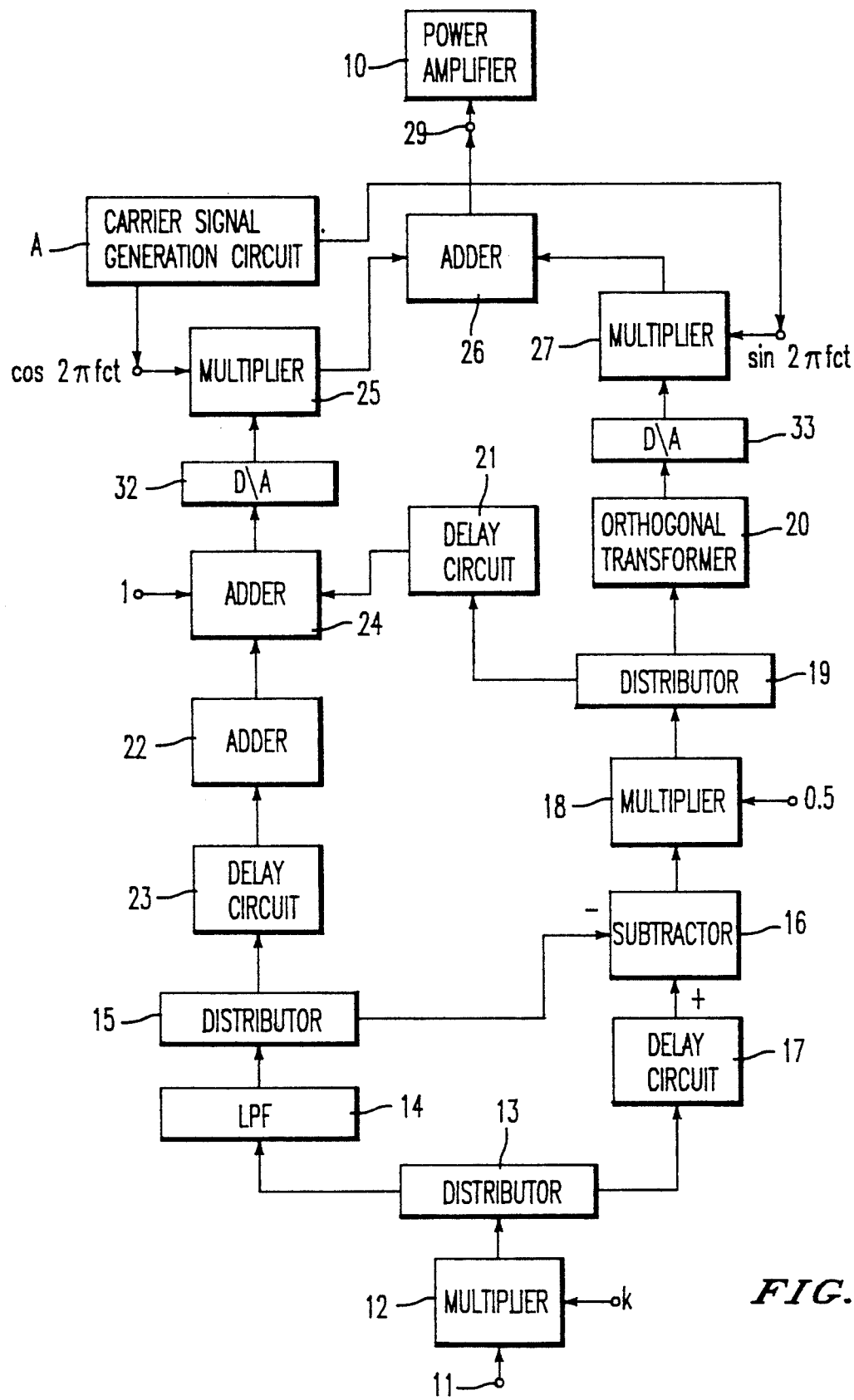

FIG. 6 shows another modification of the embodiment shown in FIG. 2. In FIG. 6, the outputs from the adder 24 and the orthogonal transformer 20 are converted into analog signals respectively through D/A (digital-to-analog) converters 32 and 33. For this reason, the multipliers 25 and 27 and the adder 26 after the D/A converters 32 and 33 are constituted by analog circuits, and the D/A converter 28 after the adder 26 is omitted. In this case, the multipliers 25 and 27 and the adder 26 have a function equivalent to that in digital processing, and the adder 26 can output a VSB modulation signal given by equation (2) described above.

The analog multipliers 25 and 27 can be easily realized by balanced modulators, and the analog adder 26 can be easily realized by a resistor mixing circuit, a transformer, or the like, thus simplifying the arrangement.

Figure 7:
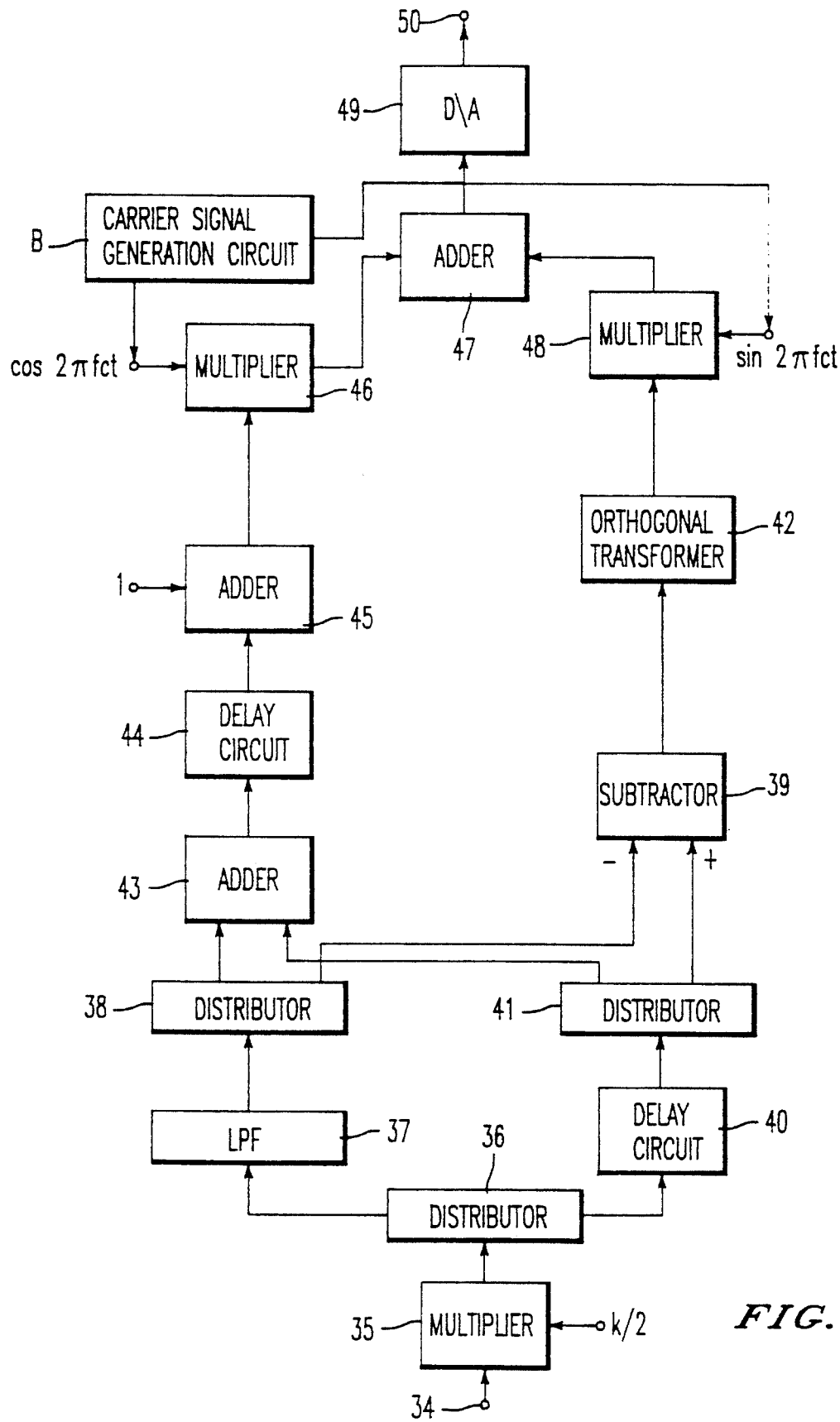
FIG. 7 is a block diagram showing the second embodiment of a digital type VSB modulation apparatus according to the present invention.

FIG. 7 shows the second embodiment of the present invention. More specifically, reference numeral 34 denotes an input terminal, which is supplied with a baseband signal digital-converted at a sampling frequency fs. The sampling frequency fs satisfies relations $fs > 2f_H$ and $fs > 2Fc$.

The digital baseband signal supplied to the input terminal 34 is multiplied with a modulation index k/2 by a multiplier 35, and is then supplied to a distributor 36. One output from the distributor 36 is supplied to an LPF 37, so that the high-frequency component of the baseband signal are cut, thereby extracting low-frequency components falling within a range between 0 and $f_L$ Hz. The output from the LPF 37 is distributed to two outputs by a distributor 38, and one output is supplied to the negative input terminal "−" of a subtracter 39.

The other output from the distributor 36 is delayed by a processing time of the LPF 37 by a delay circuit 40, and the delayed output is distributed to two outputs by a distributor 41. One output from the distributor 41 is supplied to the positive input terminal "+" of the subtracter 39. The subtracter 39 subtracts the low-frequency components of the baseband signal from the original baseband signal supplied to its positive input terminal "+", thereby extracting high-frequency components of the baseband signal falling within a range between $f_L$ and $f_H$ Hz.

The high-frequency baseband signal output from the subtracter 39 is supplied to an orthogonal transformer 42. The orthogonal transformer 42 has a function, known as, e.g., the Hilbert transformation, of shifting the phase of a signal in the entire target frequency band through 90°. More specifically, if the input to the orthogonal transformer 20 is given by:

$$(k/2) \cdot cos2n \cdot f_2 \cdot t$$

then, the transformer transforms its output to:

$$-(k/2) \cdot sin2\pi \cdot f_2 \cdot t$$

The other outputs from the distributors 38 and 41 are added by an adder 43, thus generating a baseband signal having the frequency spectrum previously shown in FIG. 3E. The baseband signal is delayed by a processing time of the orthogonal transformer 42 by a delay circuit 44, and the delayed signal is added to a constant "1" by an adder 45. Thereafter, the sum signal is multiplied, by a multiplier 46, with a carrier component given by:

$$cos2\pi \cdot fc \cdot t$$

which is generated by carrier signal generator circuit 13. As a result, a carrier in-phase component shown in FIG. 4A, i.e., the first term of the right-hand side of equation (2) described above is obtained, and is supplied to one input terminal of an adder 47.

On the other hand, the output from the orthogonal transformer 42, which output is given by:

$$-(k/2) \cdot sin2\pi \cdot f_2 \cdot t$$

is multiplied, by a multiplier 48, with a carrier component given by:

$$sin2\pi \cdot fc \cdot t$$

which is generated by carrier signal generator circuit B. As a result, a carrier orthogonal component shown in FIG. 4B, i.e., the second term of the right-hand side of equation (2) described above, is obtained, and is supplied to the other input terminal of the adder 47.

The adder 47 adds the carrier in-phase component and the carrier orthogonal component shown in FIGS. 4A and 4B, thereby generating a VSB modulation signal having a frequency spectrum shown in FIG. 4C. Thereafter, the VSB modulation signal output from the adder 47 is converted into an analog signal by a D/A converter 49, and is output through an output terminal 50. The VSB modulation signal is supplied to a power amplifier for transmission.

Therefore, according to the second embodiment shown in FIG. 7, since the carrier in-phase component and the carrier orthogonal component are generated from a digital baseband signal, and these components are added to each other to obtain the VSB modulation signal, the arrangement can become very simple and compact as compared with the prior art wherein circuit sections are simply replaced with digital circuits having the same functions.

Figure 8:
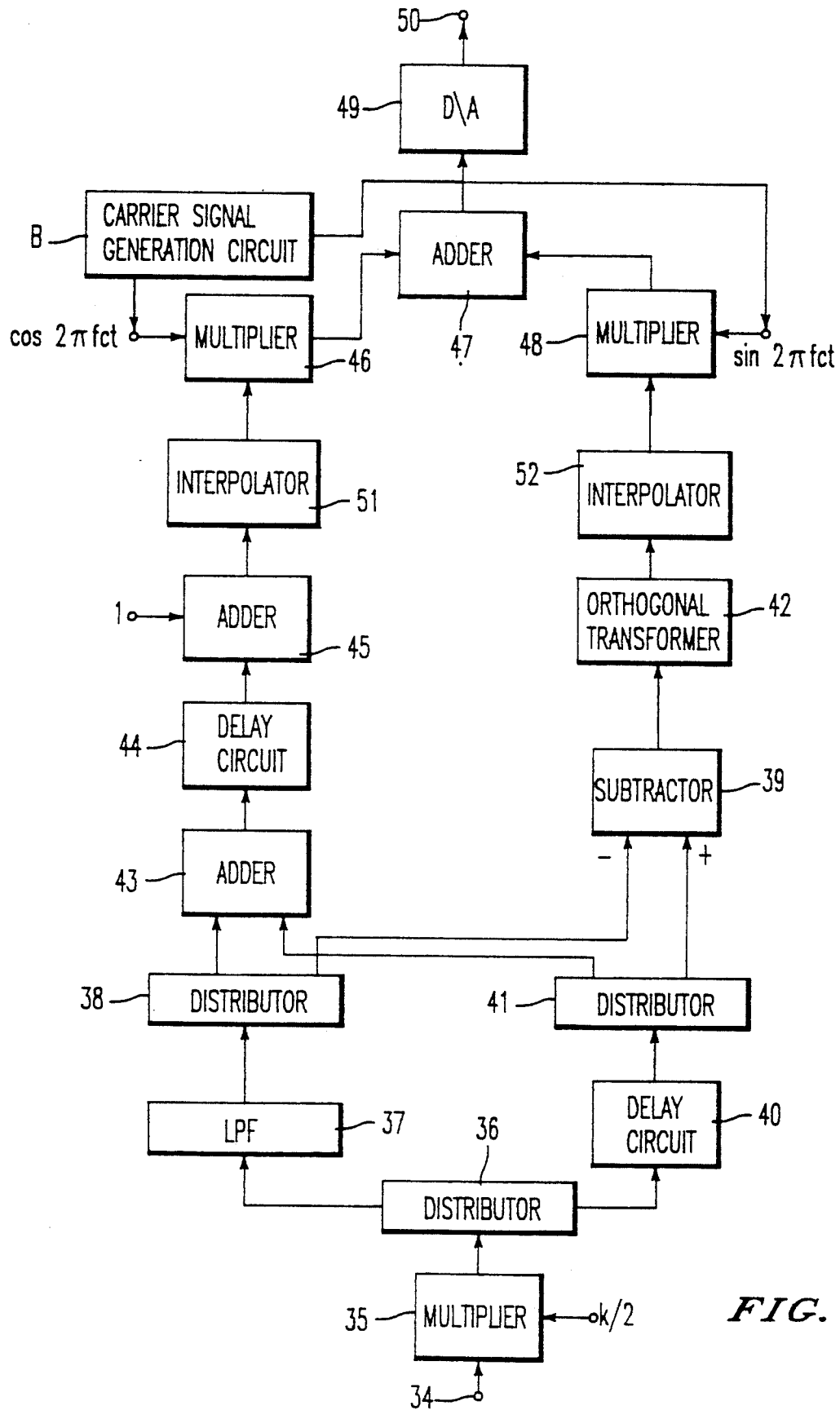
FIGS. 8 and 9 are block diagrams showing arrangements of partial modifications of the second embodiment.

The second embodiment shown in FIG. 7 exemplifies a case wherein the condition fs > 2fc is satisfied. FIG. 8 shows a modification when this condition is not satisfied. In the following description, the same reference numerals in FIG. 8 denote the same parts as in FIG. 7. In FIG. 8, interpolators 51 and 52 are respectively inserted between the adder 45 and the multiplier 46, and between the orthogonal transformer 42 and the multiplier 48. These interpolators 51 and 52 have a function of converting the sampling frequency fs to a frequency corresponding to an integer multiple of the frequency fs while preserving the spectrum of an input signal. If an output sampling frequency $fs_1$ of the interpolators 51 and 52 is set to satisfy:

$$fs1 > 2fc$$

the above embodiment can also be applied to a case wherein the carrier frequency fc is high, and the sampling frequency fs of the baseband signal is lower than a frequency twice the carrier frequency fc.

Figure 9:
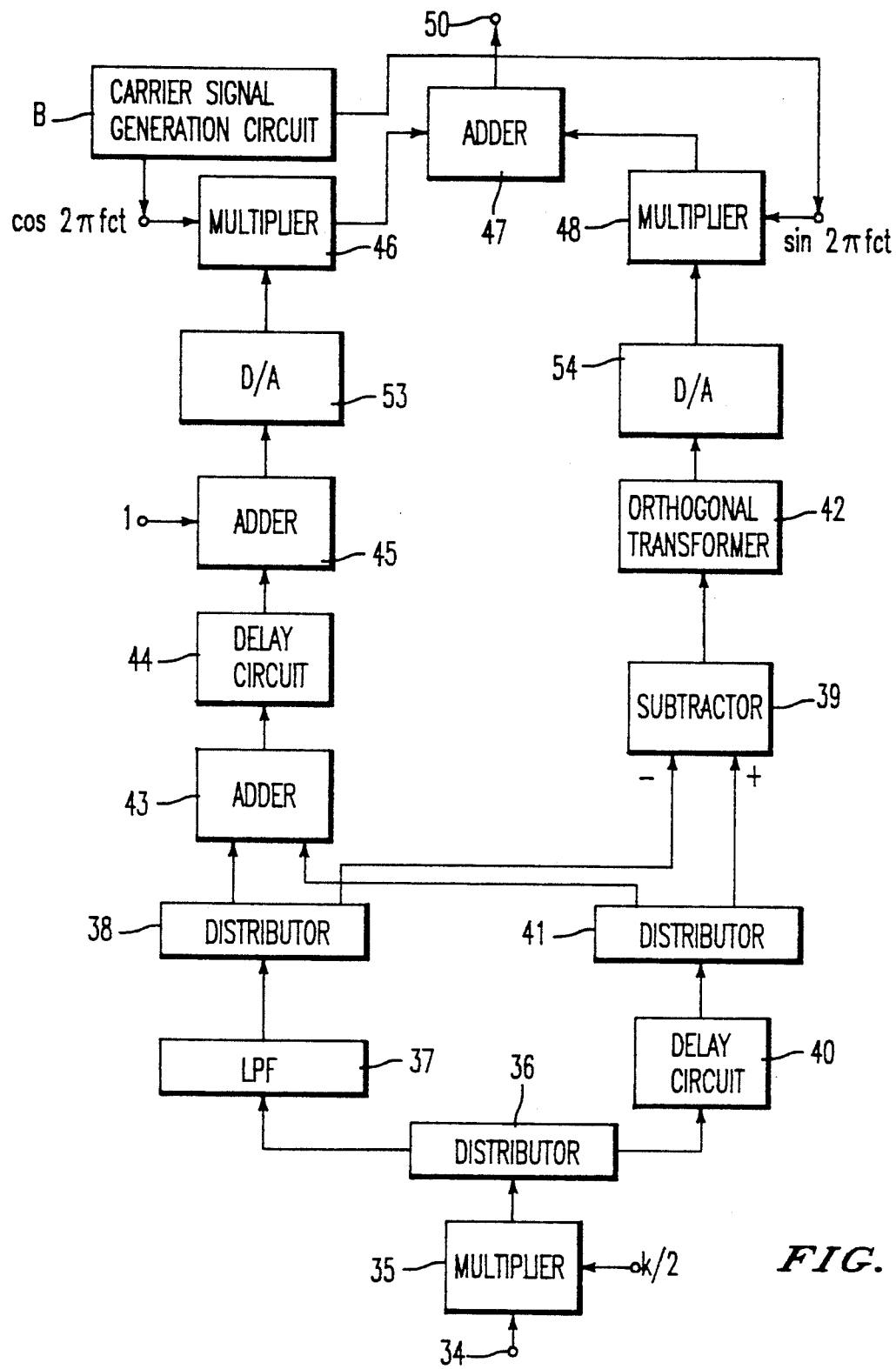

FIG. 9 shows another modification of the second embodiment shown in FIG. 7. In FIG. 9, the outputs from the adder 45 and the orthogonal transformer 42 are converted into analog signals respectively through D/A converters 53 and 54. For this reason, the multipliers 46 and 48 and the adder 47 after the D/A converters 53 and 54 are constituted by analog circuits, and the D/A converter 49 after the adder 47 is omitted. In this case, the multipliers 46 and 48 and the adder 47 have a function equivalent to that in digital processing, and the adder 47 can output a VSB modulation signal given by equation (2) described above.

The analog multipliers 46 and 48 can be easily realized by balanced modulators, and the analog adder 47 can be easily realized by a resistor mixing circuit, a transformer, or the like, thus simplifying the arrangement.

In each of the above embodiments described above, the low-frequency components are extracted from the original baseband signal by cutting the high-frequency components, and the extracted low-frequency components are subtracted from the original baseband signal, thereby obtaining the high-frequency components. In order to separate the baseband signal into low- and high-frequency components, it can be passed through low- and high-pass filters.

The VSB modulation signal generated like in each of the above embodiments is amplified by the power amplifier 10. In this case, since the input/output characteristics of the power amplifier 10 are generally nonlinear, the output from the amplifier is distorted. In order to compensate for this distortion, a predistortion method of distorting an original signal in a direction opposite to the distorting direction to cancel the distortion is used.

More specifically, assume that the input/output characteristics of the actual amplitude of the power amplifier 10 are as indicated by a solid curve in FIG. 10A. In FIG. 10A, a dotted line represents ideal input/output characteristics. Input/output amplitude characteristics required for a device for compensating for the nonlinear input/output amplitude characteristics of the power amplifier 10 by the pre-distortion method are expressed by a curve symmetrical about the ideal characteristic curve indicated by the dotted line in FIG. 10B, as indicated by the solid curve shown in FIG. 10B. If the actual input/output phase characteristics of the power amplifier 10 are represented by a solid curve in FIG. 11A, input/output phase characteristics required for a device for compensating for the phase characteristics by the pre-distortion method are expressed by a curve symmetrical about the abscissa (input amplitude), as shown in FIG. 11B.

If the coefficient:

$$\cos 2\pi \cdot fc \cdot t$$

of the first term of the right-hand side of equation (2) described above is represented by X, and the coefficient:

$$\sin 2\pi \cdot fc \cdot t$$

of the second term of the right-hand side thereof is represented by Y, the above-mentioned compensation characteristics can be obtained by the following conversion equations:

$$X' = \alpha X - \beta Y$$

$$Y' = \beta X + \alpha Y \qquad (3)$$

When X' and Y' in equations (3) are substituted in equation (2) in place of the coefficients X and Y, the function S'(t) can be rewritten as:

$$S'(t) = A\left[ (1 + k\cos 2\pi f_1 t)\cos(2\pi fct - \phi) + \frac{k}{2}\cos\{2\pi(fc + f_2)t - \phi\} \right]$$

$$\text{For} \quad A = \sqrt{\alpha^2 + \beta^2} \qquad \phi = \tan - 1\left(\frac{\beta}{\alpha}\right)$$

As can be understood from the above equation, the amplitude becomes A times that in equation (1) described above, and the phase is shifted by $-\phi$ from that in equation (1). For this reason, as shown in FIG. 10B, when an ideal output amplitude for an input amplitude Vi is represented by vo, a compensation output amplitude is represented by hÅVo, and a compensation output phase for the input amplitude Vi is represented by $\theta$, as shown in FIG. 11B, if we assume:

$$\alpha = h \cdot \cos\theta$$

$$\beta = -h \cdot \sin\theta \qquad (5)$$

Then, necessary compensation characteristics can be obtained. The above description has been made about the input amplitude vi. If compensation characteristics hn and $\theta$n for an arbitrary input amplitude vn are defined, and $\alpha$n and $\beta$n are given for the compensation characteristics hn and $\theta$n using equations (5), compensation characteristic curves can be obtained.

Figure 12:
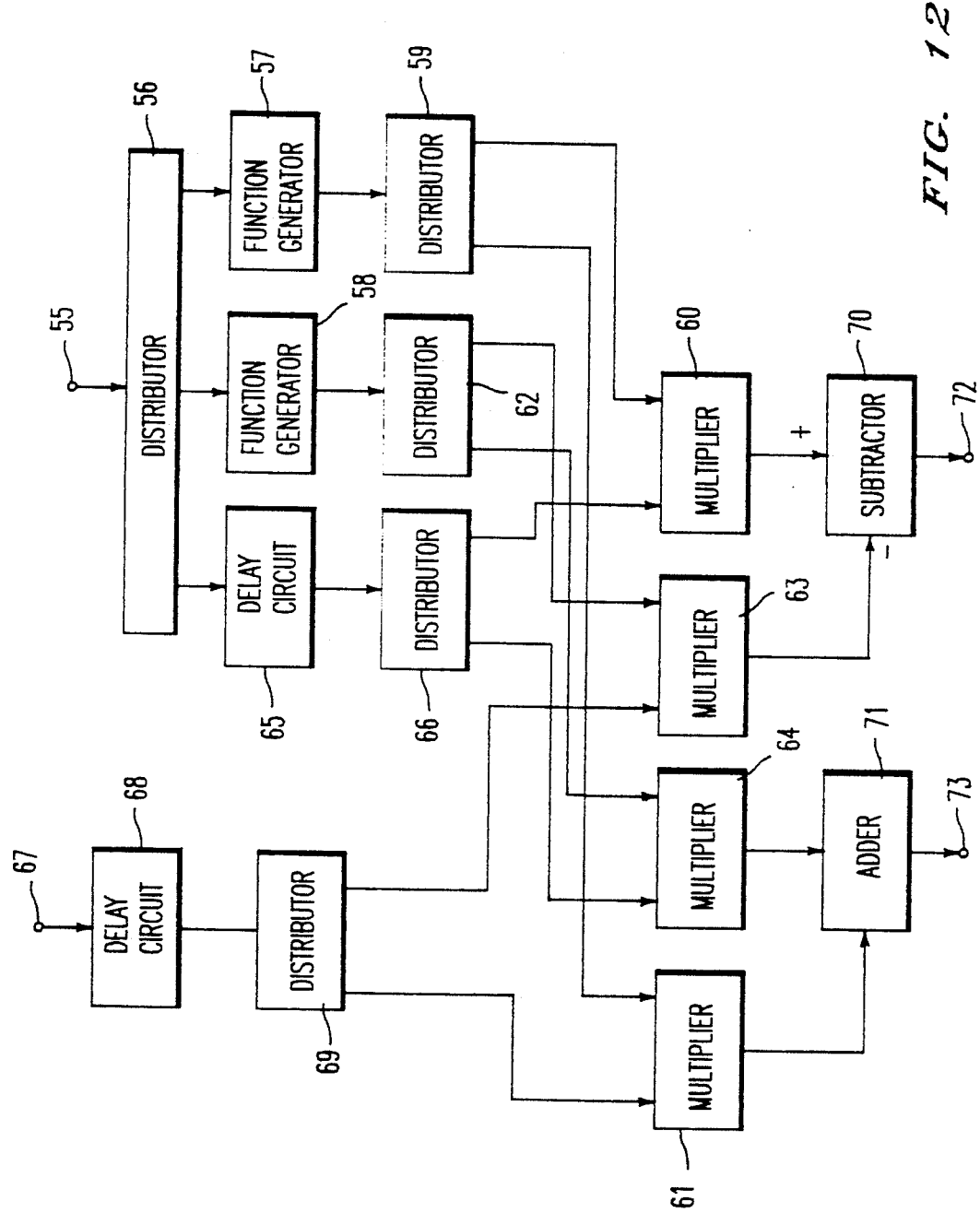
FIG. 12 is a block diagram showing an arrangement for realizing the distortion compensation.

FIG. 12 shows a distortion compensation circuit based on the above-mentioned principle. In association with the embodiment shown in FIG. 2, the output from the adder 24, i.e., a signal representing the amplitude of a modulation wave, is supplied to a distributor 56 through an input terminal 55, and is distributed. The first and second outputs of the distributor 56 are respectively supplied to function generators 57 and 58. The function generator 57 generates an output corresponding to the input/output amplitude compensation characteristic curve shown in FIG. 10B with respect to an input, and the function generator 58 generates an output corresponding to the input/output phase compensation characteristic curve shown in FIG. 11B with respect to an input. These generators comprise ROMs (read-only memories).

The output from the function generator 57 is distributed to two outputs by a distributor 59, and these outputs are respectively supplied to multipliers 60 and 61. The output from the function generator 58 is distributed to two outputs by a distributor 62, and these outputs are respectively supplied to multipliers 63 and 64. The third output from the distributor 56 is delayed by a processing time of the function generators 57 and 58 by a delay circuit 65, and the delayed output is distributed to two outputs by a distributor 66. These outputs are respectively supplied to the multipliers 60 and 64.

Meanwhile, the output from the orthogonal transformer 20 shown in FIG. 2 is delayed by a processing time of the function generators 57 and 58 by a delay circuit 68 through an input terminal 67, and the delayed output is distributed to two outputs by a distributor 69. These outputs are respectively supplied to the multipliers 61 and 63.

An output obtained by multiplying the outputs from the distributors 62 and 69 with each other by the multiplier 63 is subtracted, by a subtracter 70, from an output obtained by multiplying the outputs from the distributors 59 and 66 with each other by the multiplier 60, thus realizing a calculation of X' given by equation (3). An output obtained by multiplying the outputs from the distributors 62 and 66 with each other by the multiplier 64 is added, by an adder 71, to an output obtained by multiplying the outputs from the distributors 59 and 69 with each other by the multiplier 61, thus realizing a calculation of Y' given by equation (3). The output from the subtracter 70 is supplied to the multiplier 25 shown in FIG. 5 through an output terminal 72. The output from the adder 71 is supplied to the multiplier 27 shown in FIG. 2 through an output terminal 73. Thus, the output terminal 29 can output a VSB modulation signal, which is characteristic-compensated for an output distortion of the power amplifier 10.

when the distortion compensation circuit shown in FIG. 12 is applied to the circuit shown in FIG. 5, connections can be made, so that the outputs from the adder 24 and the orthogonal transformer 20 are respectively supplied to the input terminals 55 and 67, and the outputs from the output terminals 72 and 73 are respectively supplied to the interpolators 30 and 31. When this distortion compensation circuit is applied to the circuit shown in FIG. 6, connections can be made, so that the outputs from the adder 24 and the orthogonal transformer 20 are respectively supplied to the input terminals 55 and 67, and the outputs from the output terminals 72 and 73 are respectively supplied to the D/A converters 32 and 33. Furthermore, when this distortion compensation circuit is applied to the circuit shown in FIG. 7, connections can be made, so that the outputs from the adder 45 and the orthogonal transformer 42 are respectively supplied to the input terminals 55 and 67, and the outputs from the output terminals 72 and 73 are respectively supplied to the multipliers 46 and 48. When this distortion compensation circuit is applied to the circuit shown in FIG. 8, connections can be made, so that the outputs from the adder 45 and the orthogonal transformer 42 are respectively supplied to the input terminals 55 and 67, and the outputs from the output terminals 72 and 73 are respectively supplied to the interpolators 51 and 52. Furthermore, when this distortion compensation circuit is applied to the circuit shown in FIG. 9, connections can be made, so that the outputs from the adder 45 and the orthogonal transformer 42 are respectively supplied to the input terminals 55 and 67, and the outputs from the output terminals 72 and 73 are respectively supplied to the D/A converters 53 and 54.

Figure 13:
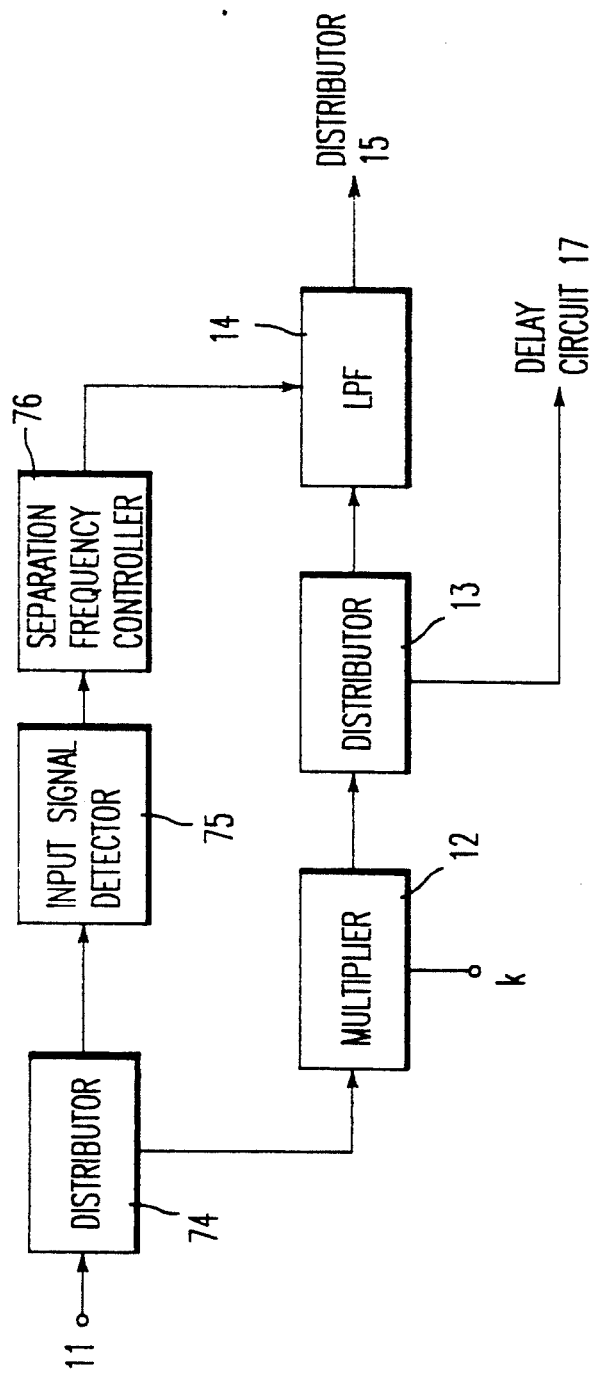
FIG. 13 is a block diagram showing the third embodiment of a digital type VSB modulation apparatus according to the present invention.

FIG. 13 shows the third embodiment of the present invention. A baseband signal supplied to an input terminal 11 is distributed to two outputs by a distributor 74. One output from the distributor 74 is subjected to the above-mentioned processing by a multiplier 12 and subsequent circuits, and the other output is supplied to an input signal detector 75. The input signal detector 75 detects a television system [e.g., an existing system (NTSC or PAL), a system that will be realized in future (hi-vision system), or the like], and outputs a signal corresponding to the detection result to a separation frequency controller 76. The separation frequency controller 76 controls the cutoff frequency (the value $f_L$ shown in FIG. 3) of an LPF 14 in correspondence with the television system based on the detection output from the input signal detector 75. Note that an identification signal for a television system such as the NTSC, PAL, hi-vision system, or the like is superposed on the baseband signal input in the third embodiment, and is detected by the input signal detector 75.

Figure 14:
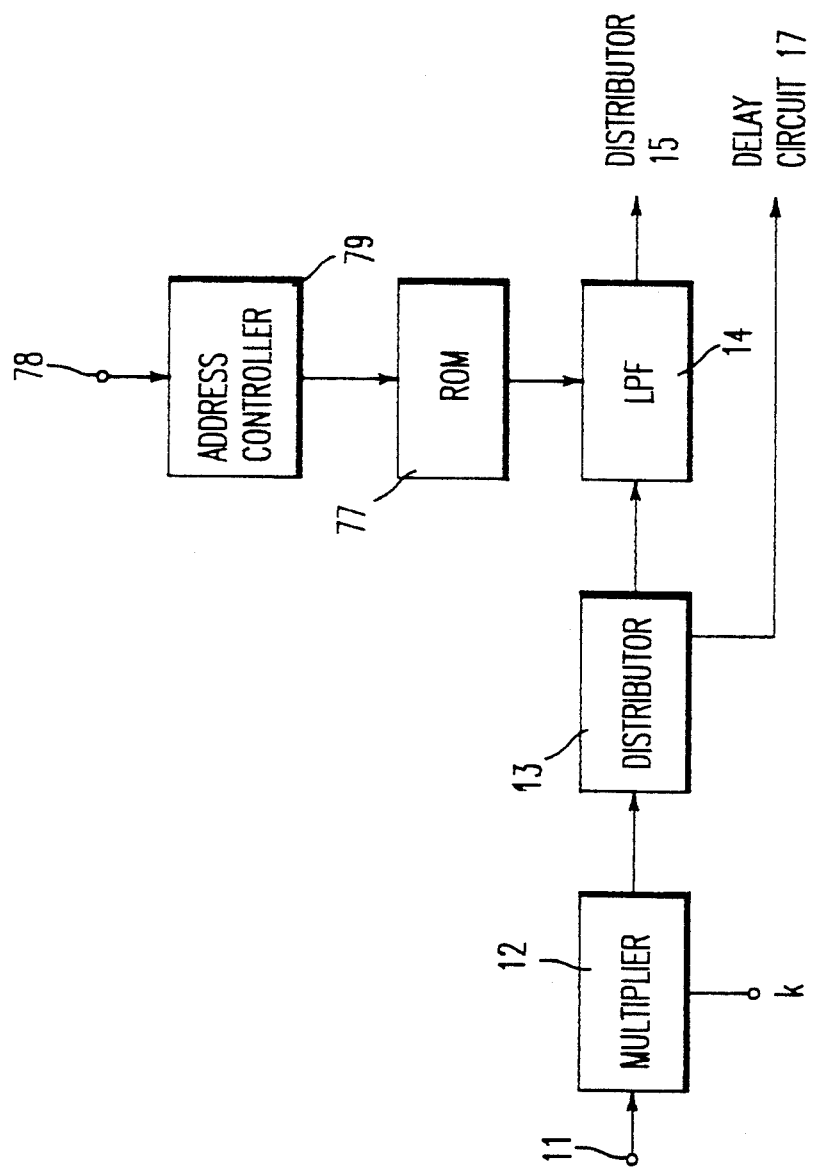
FIG. 14 is a block diagram showing an arrangement of a partial modification of the third embodiment.

When the cutoff frequency of the LPF 14 can be controlled in this manner, the baseband signals of different television systems can be modulated by a single modulator, and this is advantageous in use in future hi-vision ground broadcast and CATV equipment, overseas exports, and the like. As shown in FIG. 14, a ROM 77 for storing a plurality of control data for selecting the cutoff frequency of the LPF 14 in correspondence with the television system may be prepared, and only control data corresponding to the predetermined television system may be read out to the LPF 14 by an address controller 79 through an input terminal 78 by an external operation, so that NTSC and hi-vision modulators can be produced in the single production line, and can be distinguished from each other upon delivery from a factory. Furthermore, in place of controlling the cutoff frequency of the LPF 14, different baseband systems can be easily coped with by replacing an LPF with a cutoff frequency corresponding to a given television system such as the NTSC/PAL/hi-vision system.

The present invention is not limited to the above embodiments, and various other changes and modifications may be made within the spirit and scope of the invention.

What is claimed is:

1. A digital type VSB modulation apparatus comprising:

generation means for generating, from a digital baseband signal, an in-phase component of a modulation signal having a frequency spectrum having a high-frequency component whose level is half that of a low-frequency component thereof, and an orthogonal component of the modulation signal of a high-frequency component having a frequency spectrum whose level is half that of the low-frequency component of the in phase component;

a carrier signal generation means for generating two carrier signals having a same frequency and having different phases;

carrier component generation means for multiplying the in-phase component and the orthogonal component output from said generation means with the carrier signals output from said carrier signal generation means, respectively, so as to obtain a carrier in-phase component and a carrier orthogonal component; and synthesis means for synthesizing the carrier in-phase component and the carrier orthogonal component output from said carrier component generation means so as to obtain a VSB modulation signal.

2. The apparatus according to claim 1, wherein said generating means comprises: first multiplier means for multiplying the baseband signal with a predetermined modulation index; extraction means for extracting a low-frequency component of an output from said first multiplier means; first subtracter means for subtracting an output from said extraction means from an output from said first multiplier means to obtain a high-frequency component of the baseband signal; second multiplier means for multiplying an output level of said first subtracter means with $\frac{1}{2}$; orthogonal transformer means for performing orthogonal transformation processing of an output from said second multiplier means to obtain the orthogonal component; and first adder means for adding an output from said second multiplier means and an output from said extraction means to obtain the in-phase component.

3. The apparatus according to claim 2, wherein said carrier component generation means comprises: second adder means for adding an output from said first adder means to a constant 1; third multiplier means for multiplying an output from said second adder means with a carrier signal; and fourth multiplier means for multiplying an output from said orthogonal transformer means with a carrier signal having a 90° phase difference from the carrier signal multiplied by said third multiplier means.

4. The apparatus according to claim 3, further comprising: interpolators, inserted between said second adder means and said third multiplier means, and between said orthogonal transformer means and said fourth multiplier means, for converting a sampling frequency so as to generate the VSB modulation signal even when the sampling frequency of the baseband signal is lower than a frequency twice a carrier frequency.

5. The apparatus according to claim 3, further comprising: digital-to-analog converter means, arranged between said second adder means and said third multiplier means, and between said orthogonal transformer means and said fourth multiplier means, so that said third multiplier means, said fourth multiplier means, and said synthesis means are constituted by analog circuits.

6. The apparatus according to claim 3, further comprising: distortion compensation means, arranged between said second adder means and said third multiplier means, and between said orthogonal transformer means and said fourth multiplier means, for distorting a signal in a direction opposite to a direction of distortion generated in an external circuit connected to an output side of said synthesis means.

7. The apparatus according to claim 4, further comprising: distortion compensation means, arranged between said second adder means and said interpolator, and between said orthogonal transformer means and said interpolator, for distorting a signal in a direction opposite to a direction of distortion generated in an external circuit connected to an output side of said synthesis means.

8. The apparatus according to claim 5, further comprising: distortion compensation means, arranged between said second adder means and said digital-to-analog converter means, and between said orthogonal transformer means and said digital-to-analog converter means, for distorting a signal in a direction opposite to a direction of distortion generated in an external circuit connected to an output side of said synthesis means.

9. The apparatus according to claim 1, wherein said generation means comprises; first multiplier means for multiplying the baseband signal with a predetermined modulation index; extraction means for extracting a low-frequency component of an output from said first multiplier means; first subtracter means for subtracting an output from said extraction means from an output from said first multiplier means so as to obtain a high-frequency component of the baseband signal; orthogonal transformer means for performing orthogonal transformation processing of an output from said first subtracter means to obtain the orthogonal component; and first adder means for adding an output from said first multiplier means and an output from said extraction means to obtain the in-phase component.

10. The apparatus according to claim 9, wherein said carrier component generation means comprises: second adder means for adding an output from said first adder means to a constant 1; second multiplier means for multiplying an output from said second adder means with a carrier signal; and third multiplier means for multiplying an output from said orthogonal transformer means with a carrier signal having a 90° phase difference from the carrier signal multiplied by said second multiplier means.

11. The apparatus according to claim 10, further comprising: interpolators, inserted between said second adder means and said second multiplier means, and between said orthogonal transformer means and said third multiplier means, for converting a sampling frequency so as to generate the VSB modulation signal even when the sampling frequency of the baseband signal is lower than a frequency twice a carrier frequency.

12. The apparatus according to claim 10, further comprising: digital-to-analog converter means arranged between said second adder means and said second multiplier means, and between said orthogonal transformer means and said third multiplier means, so that said second multiplier means, said third multiplier means, and said synthesis means are constituted by analog circuits.

13. The apparatus according to claim 10, further comprising: distortion compensation means, arranged between said second adder means and said second multiplier means, and between said orthogonal transformer means and said third multiplier means, for distorting a signal in a direction opposite to a direction of distortion generated in an external circuit connected to an output side of said synthesis means.

14. The apparatus according to claim 11, further comprising: distortion compensation means, arranged between said second adder means and said interpolator, and between said orthogonal transformer means and said interpolator, for distorting a signal in a direction opposite to a direction of distortion generated in an external circuit connected to an output side of said synthesis means.

15. The apparatus according to claim 12, further comprising: distortion compensation means, arranged between said second adder means and said digital-to-analog converter means, and between said orthogonal transformer means and said digital-to-analog converter means, for distorting a signal in a direction opposite to a direction of distortion generated in an external circuit connected to an output side of said synthesis means.

16. The apparatus according to claim 6, 7, 8, 13, 14, or 15, wherein said distortion compensation means arranged at an output side of said second adder means comprises: first function generator means for generating an output corresponding to input/output amplitude compensation characteristics for compensating for nonlinear input/output amplitude characteristics of said external circuit upon reception of an output from said second adder means; second function generator means for generating an output corresponding to input/output phase compensation characteristics for compensating for nonlinear input/output phase characteristics of said external circuit upon reception of an output from said orthogonal transformer means; fifth multiplier means for multiplying an output from said first function generator means with an output from said second adder means; sixth multiplier means for multiplying an output from said second function generator means with an output from said 10 orthogonal transformer means; and second subtracter means for subtracting an output from said sixth multiplier means from an output from said fifth multiplier means, and said distortion compensation means arranged at an output side of said orthogonal transformer means comprises: seventh multiplier means for multiplying an output from said second function generator means with an output from said second adder means; eighth multiplier means for multiplying an output from said first function generator means with an output from said orthogonal transformer means; and third adder means for adding an output from said seventh multiplier means to an output from said eighth multiplier means.

17. The apparatus according to claim 2 or 9, further comprising: detection means for detecting a television system from the baseband signal; and control means for controlling a frequency extracted by said extraction means according to a detection output from said detection means so as to change VSB characteristics.

18. The apparatus according to claim 2 or 9, further comprising: recording means for recording a plurality of control data for controlling a frequency extracted by said extraction means in correspondence with a plurality of television systems so as to change VSB characteristics, the control data corresponding to a desired television system being supplied from said recording means to said extraction means by an external operation.

* * * * *

UNITED STATES PATENT AND TRADEMARK OFFICE
CERTIFICATE OF CORRECTION

PATENT NO. : 5,327,462
DATED : July 5, 1994
INVENTOR(S) : Yasuo TAKAHASHI, et al.

It is certified that error appears in the above-indentified patent and that said Letters Patent is hereby corrected as shown below:

On the title page, Item [75], the 5th inventor's name appears twice in the inventorship. Please delete the second name as follows: "Masatoshi Hamada"

--Yasuo Takahashi; Tatsuya Ishikawa; Toshio Aoki; Nobuyuki Miki; Masatoshi Hamada; Yasuhiro Hashimoto; Kenji Ueoka; Nobuhiko Kawai, all of Tokyo, Japan--

Signed and Sealed this

Twentieth Day of September, 1994

Attest:

BRUCE LEHMAN

*Attesting Officer*  *Commissioner of Patents and Trademarks*